(12) United States Patent
Edwards et al.

(10) Patent No.: US 8,359,398 B1
(45) Date of Patent: Jan. 22, 2013

(54) EFFICIENT PROXYING OF MESSAGES

(75) Inventors: Saul J. Edwards, San Francisco, CA (US); Shirish Rai, Austin, TX (US); Christine Tomlinson, Austin, TX (US)

(73) Assignee: Oracle America, Inc., Redwood City, CA (US)

( * ) Notice: Subject to any disclaimer, the term of this patent is extended or adjusted under 35 U.S.C. 154(b) by 2512 days.

(21) Appl. No.: 10/760,747

(22) Filed: Jan. 20, 2004

(51) Int. Cl.
*G06F 15/16* (2006.01)
(52) U.S. Cl. ...................................................... 709/230
(58) Field of Classification Search .................. None
See application file for complete search history.

(56) References Cited

U.S. PATENT DOCUMENTS

| | | | | |
|---|---|---|---|---|
| 5,481,735 | A * | 1/1996 | Mortensen et al. | 709/246 |
| 5,761,438 | A * | 6/1998 | Sasaki | 709/247 |
| 6,003,084 | A * | 12/1999 | Green et al. | 709/227 |
| 6,360,194 | B1 * | 3/2002 | Egolf | 703/26 |
| 6,581,108 | B1 * | 6/2003 | Denison et al. | 709/245 |
| 6,671,739 | B1 * | 12/2003 | Reed | 709/246 |
| 6,701,408 | B2 * | 3/2004 | Egner et al. | 711/101 |
| 6,910,082 | B1 * | 6/2005 | Marcotte | 709/246 |
| 6,987,813 | B1 * | 1/2006 | Demetrescu et al. | 375/295 |
| 7,050,424 | B2 * | 5/2006 | Cheng et al. | 370/352 |
| 7,136,935 | B2 * | 11/2006 | Rao | 709/250 |
| 7,149,865 | B2 * | 12/2006 | Chamberlain et al. | 711/170 |
| 7,315,860 | B1 * | 1/2008 | Harvey | 707/10 |
| 2002/0002615 | A1 * | 1/2002 | Bhagavath et al. | 709/227 |
| 2002/0087784 | A1 * | 7/2002 | Egner et al. | 711/111 |
| 2002/0120782 | A1 * | 8/2002 | Dillon et al. | 709/246 |
| 2002/0124095 | A1 * | 9/2002 | Sultan | 709/230 |
| 2003/0018753 | A1 * | 1/2003 | Seki | 709/219 |
| 2003/0037154 | A1 * | 2/2003 | Poggio et al. | 709/230 |
| 2003/0079023 | A1 * | 4/2003 | Stefansson et al. | 709/227 |
| 2003/0105830 | A1 * | 6/2003 | Pham et al. | 709/216 |
| 2003/0131263 | A1 * | 7/2003 | Keane et al. | 713/201 |
| 2004/0107287 | A1 * | 6/2004 | Ananda et al. | 709/230 |
| 2005/0097296 | A1 * | 5/2005 | Chamberlain et al. | 711/170 |
| 2006/0259639 | A1 * | 11/2006 | Aken et al. | 709/245 |

OTHER PUBLICATIONS

Michel, Scott et al., "Adaptive Web Caching: Towards a New Caching Architecture", 3$^{rd}$ International Web Caching Workshop Paper, UCLA Computer Science Department, Los Angeles, CA, Jun. 15-17, 1998, 9 pages <downloaded from http://citeseer.ist.psu.edu/context/54833/0 on Jul. 25, 2005>.

Ogel, F., et al., "C/SPAN: a Self-Adapting Web Proxy Cache", Proceedings of the Autonomic Computing Workshop Fifth Annual International Workshop on Active Middleware Services (AMS'03), 2003 IEEE, 8 pages.

* cited by examiner

*Primary Examiner* — Brian P Whipple
(74) *Attorney, Agent, or Firm* — Brooks Kushman P.C.

(57) ABSTRACT

Efficiently processing messages at a proxy without intermediary copying increases a proxy's capabilities since fewer resources are expended on operations, such as intermediary copying. A proxy determines which data of a message received into memory will be maintained. The proxy indicates, in an ordered encoding, locations of the determined data and of update data. The update data may be a new message segment, session identifier, etc. The ordered encoding, which indicates the data in order as they will occur in the forwarded message, is used to forward the message with the maintained data and the update data.

61 Claims, 6 Drawing Sheets

EFFICIENT PROXYING OF MESSAGES

BACKGROUND

1. Field of the Invention

The present invention relates to the field of networks. More specifically, the present invention relates to proxying.

2. Description of the Related Art

A proxy element is often used in communication networks, including those that support directory service transactions and traffic. In general, the proxy is transparent to both the clients and the servers. When a client initiates a session to request data from a server, the client establishes a session with the server. The proxy terminates the client's session 'pretending' to be the server. The proxy then initiates a connection to the appropriate server and 'bridges' the client session to the server connection while monitoring the session.

FIGS. 1A-1B illustrate a conventional technique for processing of a directory request message at a proxy. FIG. 1A illustrates copying of a directory request message for transmission of the directory request message. A directory request message 101 is received by a proxy 100. The proxy 100 is forwarding the directory request message 101 to an appropriate server, but with a new message identifier. The proxy 100 copies portions of the directory request message 101 up to the original message identifier into a memory 103. The proxy 100 then copies the new message identifier 104 into the memory 103. Finally, the proxy 100 copies the last portion of the directory request message 101, which is after the original message identifier, into the memory 103 after the copied new message identifier 105.

FIG. 1B illustrates transmission of a new directory request message. The proxy 100 assembles the copied sections and added section of information into a new directory request message 108. The proxy 100 then passes the newly assembled directory request message 108 to a network interface 107. The proxy 100 transmits the directory request message 108 with the network interface 107.

Conventional techniques for updating of directory messages may require a proxy to copy, disassemble, update and reassemble the directory message. As a result, the update of the directory request message may require extra memory space for copying original sections of directory messages and for copied update information. Further, the update of directory messages consumes processing resources of the proxy. Generally, the speed of communication between a client and a server is limited by the efficiency with which the proxy to processes directory messages. More efficient techniques are desired.

SUMMARY

It has been discovered that messages can be updated and re-transmitted by a proxy without intermediate copying. In this way, a proxy can update and transmit messages with fewer resources, including memory and processing time. By providing an ordered encoding that indicates portions of a message that will be preserved and that indicates data that will update the message, the indications of the preserved message portions and the update data being in an order in accordance with the structure of the to be transmitted message, it is possible to facilitate transmission of messages at a proxy without intermediate disassembly, copying, and reassembly. A sequential encoding of data indicators can be used to write an updated message as a stream or vector of data to a network interface, such as a physical or logical socket. In general, gains in performance multiply in proportion with the amount of directory message traffic being processed.

In accordance with some embodiments of the invention, a method of operating a proxy comprises receiving into memory a first message. One or more of a pre-determined set of portions of the first message to be maintained are indicated in an ordered encoding. The ordered encoding also indicates update data. The ordered encoding is used to transmit a second message that includes the maintained first message portions and the update data in accordance with the ordered indications.

In accordance with some embodiments of the invention, a method comprises determining a first set of data of a first message to be preserved and a second set of data to be included in a second message with the preserved data. The method further comprises indicating locations of the first and second set of data in an ordered encoding and submitting the ordered encoding for transmission of the second message. One or more of the entries of the ordered encoding have been pre-determined for at least a portion of the first set of data. The second message is in accordance with the order of the first and second sets of data as indicated by the ordered encoding.

In accordance with some embodiments of the invention, a proxy indicates a first set of one or more memory locations of a first set of information included in a first message and a second set of one or more locations of a second set of information related to the first message. The proxy provides an ordered encoding of the first and second sets of memory location indications for transmission of a second message that includes the first and second sets of information. The order of the first and second sets of information in the second message is in accordance with the order of the encoding.

In accordance with some embodiments of the invention, a directory system comprises a plurality of directory resources, and a proxy for the plurality of directory resources. The proxy intercepts directory messages and updates intercepted directory messages. The proxy uses an ordered encoding that indicates locations corresponding to one or more segments of the directory messages to be preserved for transmission and locations corresponding to update segments to be added to the preserved segments for transmission of updated intercepted directory messages. The updated intercepted directory messages are in accordance with the ordered encoding.

In accordance with some embodiments of the invention, an apparatus comprises a memory to receive messages. The apparatus further comprises means for transmitting an ordered encoding that indicates one or more locations of portions of a received message to be preserved, and indicates one or more locations of update data to update received messages.

In accordance with some embodiments of the invention, a computer program product encoded in one or more machine-readable media, comprises a first sequence and second sequence of instructions. The first sequence of instructions processes a received message, and determines data of the message to be preserved and memory locations thereof. The first sequence of instructions also determines update data and memory locations thereof. The second sequence of instructions indicates the determined memory locations in an ordered encoding. The order of the encoding is in accordance with order the type of the received message.

These and other aspects of the described invention will be better described with reference to the Description of the Preferred Embodiment(s) and accompanying Figures.

BRIEF DESCRIPTION OF THE DRAWINGS

The present invention may be better understood, and its numerous objects, features, and advantages made apparent to those skilled in the art by referencing the accompanying drawings.

FIG. 1A illustrates copying of a directory request message for transmission of the directory request message. FIG. 1B illustrates transmission of a new directory request message.

The use of the same reference symbols in different drawings indicates similar or identical items.

DESCRIPTION OF THE PREFERRED EMBODIMENT(S)

The description that follows includes exemplary systems, methods, techniques, instruction sequences and computer program products that embody techniques of the present invention. In particular, in some particular implementations suited to directory transactions, protocols and services typical of directory servers such as those in accordance with Lightweight Data Access Protocol (LDAP), OpenLDAP, X.200, X.400, X.500, Universal Description, Discovery and Integration (UDDI), or the like, are described in some detail. However, it is understood that the described invention may be practiced without these specific details. In other instances, well-known protocols, structures and techniques have not been shown in detail in order not to obscure the invention.

Figure 1A:
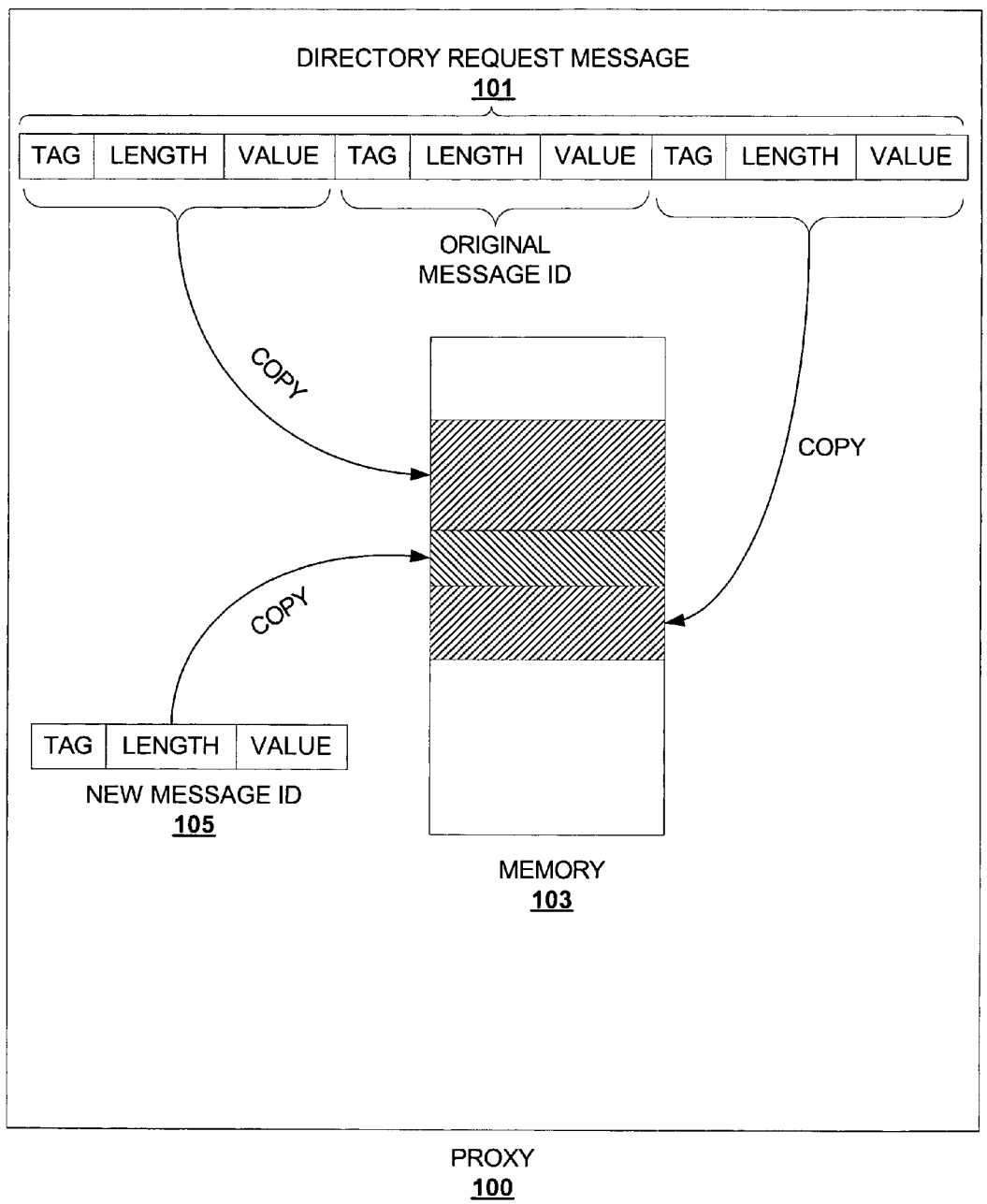
FIGS. 1A-1B illustrate processing of a directory request message at a proxy.
Figure 1B:
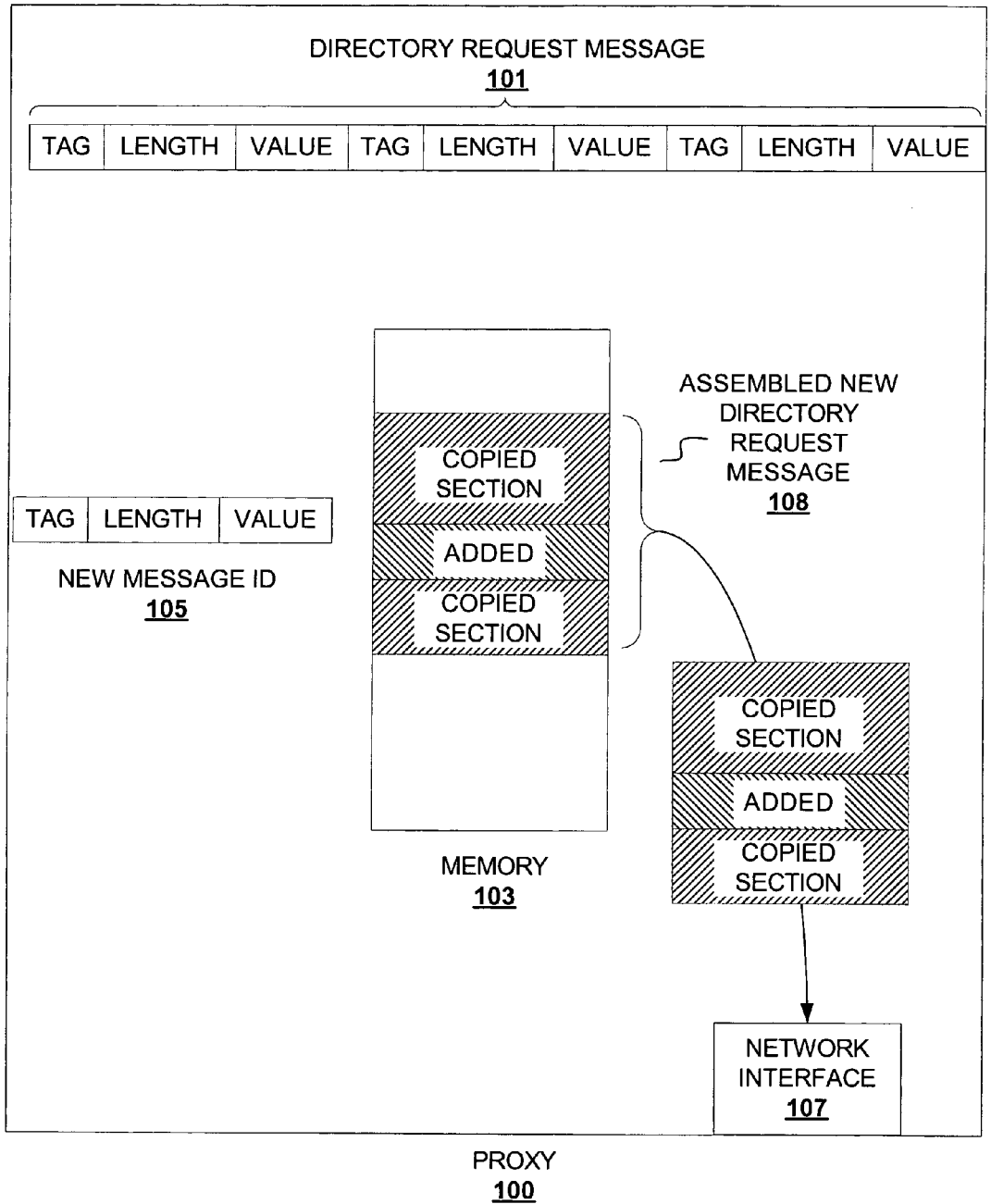
Figure 2:
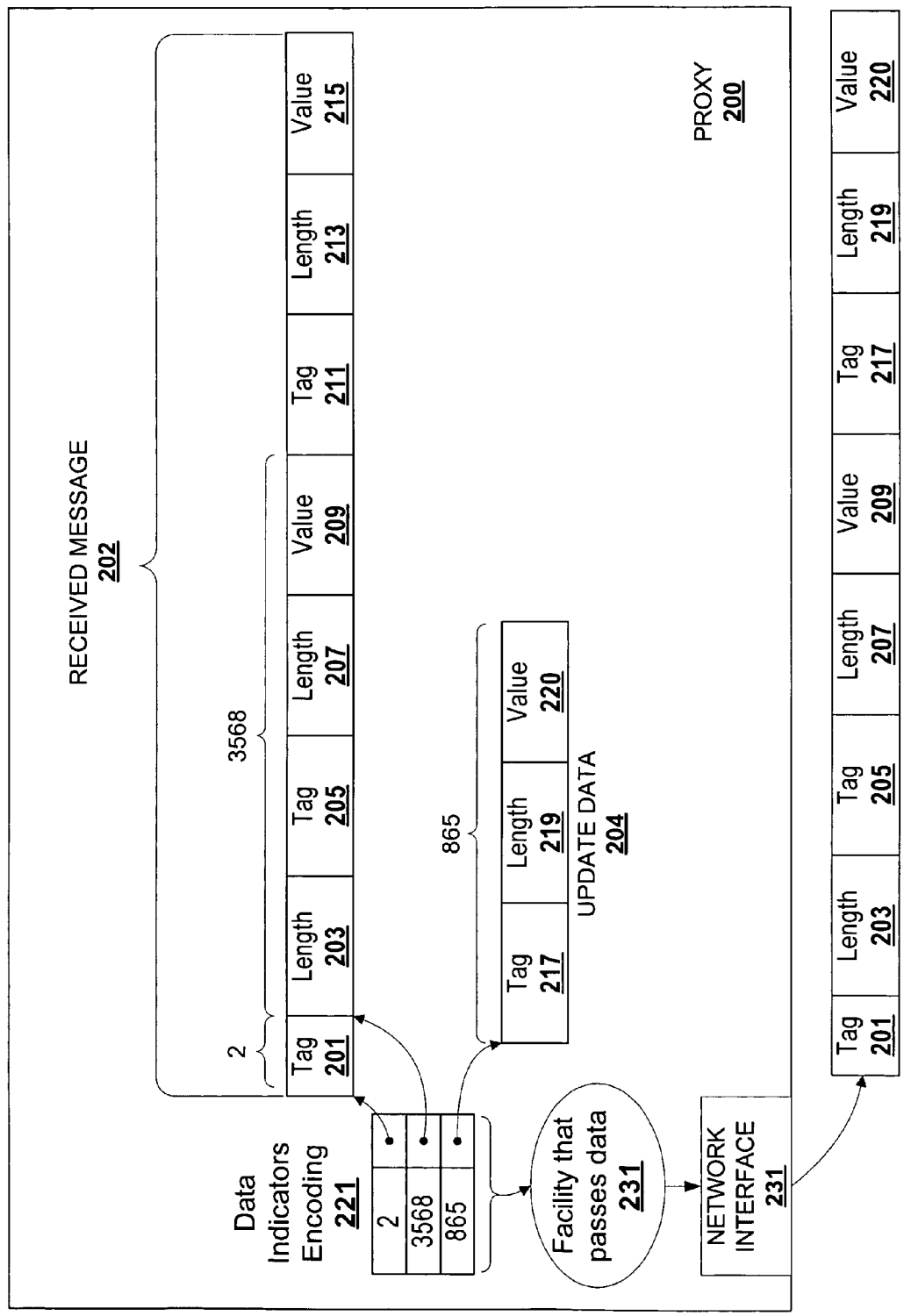
FIG. 2 depicts a proxy 200 forwarding a directory message with an encoding of data segment indicators according to some realizations of the invention.

FIG. 2 depicts a proxy 200 forwarding a directory message with an encoding of data segment indicators according to some realizations of the invention. A proxy 200 has received a message 202 (e.g., a directory search request, a directory response message, etc.). The illustrated message 202 includes a sequence of data segments, each of which includes three fields: a tag field, a length field and a value field. The received message 202 includes the following sequence of fields populated with some data: a tag field 201, a length field 203, a tag field 205, a length field 207, a value field 209, a tag field 211, a length field 213, and a value field 215. In the exemplary message, data segments may be nested within value fields of another data segment.

For example, the first data segment of the received message 202 includes the tag field 201, the length field 203, and the value field includes the remainder of the message. Hence, the remaining data segments beginning with the tag fields 205 and 211 are nested within the value field of the first data segment. The first tag field 201 and length field 203 applies to the directory message 202 as a whole. For example, assume the message 202 is a personnel record that includes data, such as employee name and contact information. The tag field 201 would indicate the message 202 as a personnel record data type. The length field 203 would indicate the length of the remainder of the message (i.e., without the leading fields 201 and 203). The tag field 205 would indicate a data type of name and the length field 207 would indicate the length of the value field 209. If name data is not atomic, then the value field 209 would include data segments for each name data element (e.g., an employee name is decomposed into a first name, last name, and middle initial). The exemplary structure of the data will be in accordance with a standard, such as LDAP, OpenLDAP, X.200, X.400, X.500, standard that conforms to Abstract Syntax Notation (ASN), etc. For transmission, the structured data is encoded in accordance with an encoding scheme, such as Basic Encoding Rules (BER) or Distinguished Encoding Rules (DER).

A data indicators encoding 221 includes an enumeration of data indicators and associated length for each corresponding data segment. In FIG. 2, the first row of the encoding 221 includes a length of 2 and a data indicator that references the tag field 201. The next row of the encoding 221 includes a length value 3568 and a data indicator that references the length field 203. The third row of the encoding 221 includes a length value 865 and a data indicator that references update data 204. Proxies make a variety of updates to a message and may not make updates to a message. For example, a proxy may append a data segment to a message, update the first length field of the message, replace a data segment and/or field, modify control data (e.g., session identifier), etc. The update data 204 includes a tag field 217, a length field 219, and a value field 221. A facility 223 passes the data indicated by the encoding 221 in accordance with the encoding 221 to a network interface 231 (e.g., physical socket, logical socket, etc.). The facility 223 locates the data indicated by each row and writes the corresponding amount of data. In FIG. 2, the facility 223 follows the data indicator of the first row of the encoding 221 and writes 2 data units (e.g., bits of data, bytes of data, octets, etc.) from the point referenced by the first indicator to the network interface 231. The facility 223 then writes 3568 data units beginning at the point indicated by the data indicator in the second row of the encoding 221. Finally, the facility 223 writes 865 data units from the point referenced by the data indicator of the third row in the encoding 221. Hence, the transmitted message includes a sequence of data beginning with the first 3570 data units of the original message 202 followed by the 865 data units of the update data 204 in accordance with the order of the encoding, which corresponds to the order of the to be forwarded message.

Various realizations of the invention implement the encoding 221 and the facility 223 differently. The encoding 221 may be a multi-dimensional array, a linked list, a tree, a hash table, etc. For example, the encoding 221 may be a static array with an element for each data segment and/or field that is a possible candidate for being changed and/or replaced (i.e., predefined array of data segments and/or fields that may be modified). The possible candidates for being changed or replaced includes a myriad of information (e.g., control information, session identifier, message identifier, server credentials, server authentication information, etc.). The static array may also include array elements for data segments and/or fields to be added to a message, such as extensions. The encoding may be an encoding with dynamic characteristics, such as a linked list. The encoding generated for each message dependent on the particular modifications to the message. For example, as the message is processed sequentially and replacement/new data segments generated, the encoding is updated with new elements.

In addition, realizations of the invention utilize different techniques for passing the data to a network interface in accordance with the encoding. Hardware, software, and/or firmware may be implemented to process the data of the encoding. For example, the encoding may be implemented to interact with logic that streams the data in accordance with the encoding to a network interface; the facility 223 may be a function/method, such as writev; etc.

A proxy that provides indications of maintained directory message data and one or more indications of update directory message data for transmission avoids expending processing time on copying and moving the information. In addition, a proxy consumes less memory since the directory request message is not copied and moved. Using indications instead of copying data allows a proxy to avoid unnecessary memory accesses, which reduces the amount of time spent processing directory messages before transmitting them.

Figure 3:
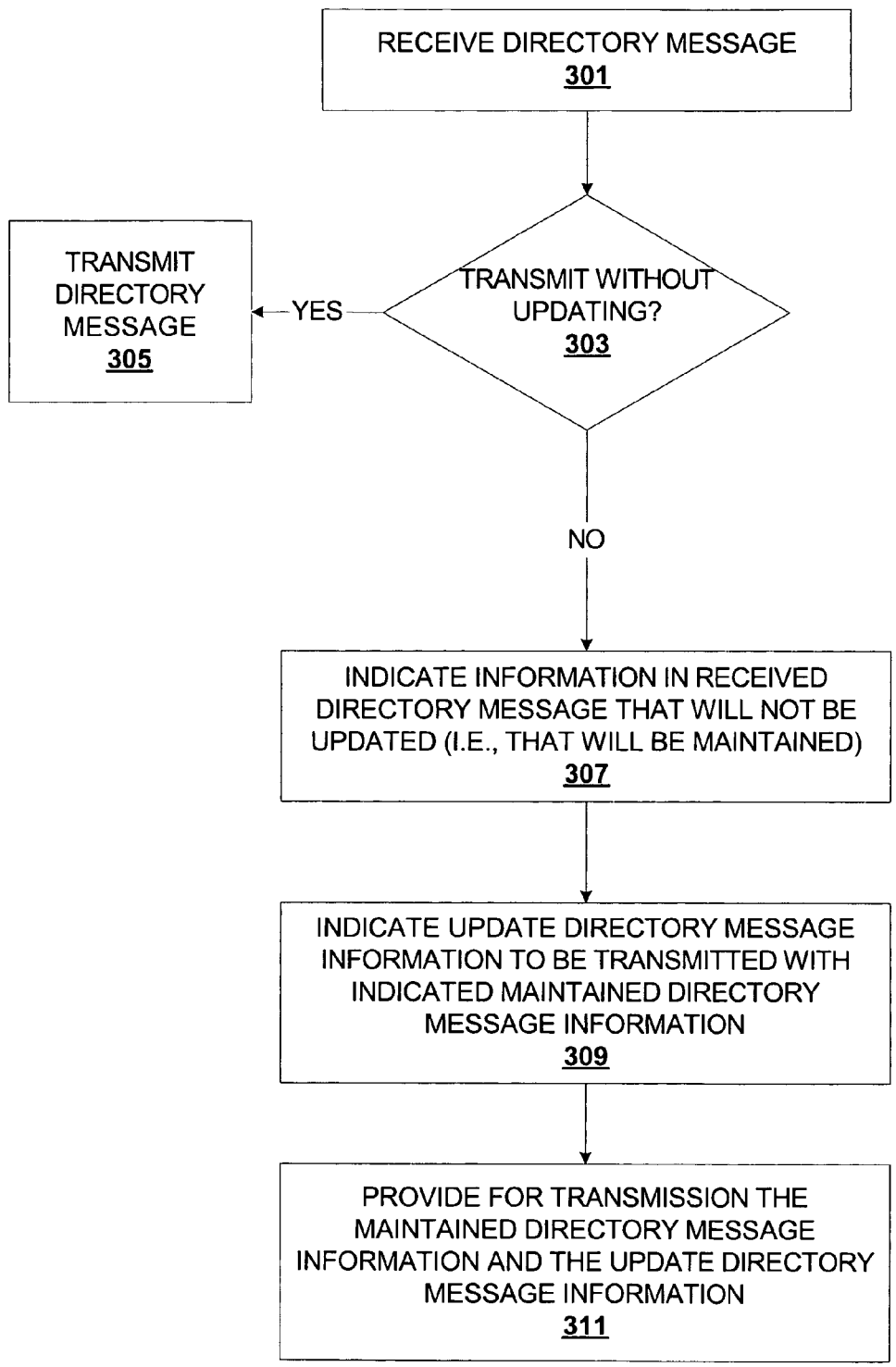
FIG. 3 depicts a flowchart for transmission of directory messages without intermediate copying according to some realizations of the invention.

FIG. 3 depicts a flowchart for transmission of directory messages without intermediate copying according to some realizations of the invention. At block 301, a directory message is received. At block 303, it is determined if the directory message is to be transmitted without updating. If the directory message is to be transmitted without updating, then control flows to block 305. If the directory message is to be updated before transmission, then control flows to block 307.

At block 305, the directory message is transmitted.

At block 307, information in the received directory message that will be maintained is indicated. At block 309, the update directory message information that will be transmitted with the maintained directory message information is indicated. At block 311, the indications are provided for transmission of the maintained directory message information and the update directory message information.

For example, a proxy receives a client directory request. A proxy intercepts the client directory request and forwards it to the appropriate server. The proxy may add additional control information before forwarding the directory request. The proxy provides a pointer to the client directory request and pointers to the control information to be appended to the received client directory request. When the proxy receives a server directory response that corresponds to the client directory request, the proxy intercepts the server directory response and overrides the message identifier provided by the server. The proxy overrides the server assigned message identifier because different servers may use the same message identifier. The proxy indicates where in memory the sections of directory message information of the server directory response to be maintained or preserved are located. The proxy also indicates where the overriding message identifier is located. The proxy then provides these indications to transmit the server directory response with the proxy assigned message identifier. In addition to adding control information and modifying a message identifier, a proxy may update length values, tags, internal pointers, header information, directory message data, additional directory message characteristic information, etc. The information that changes and/or location of information in directory message may vary depending on the governing rules (e.g., Abstract Syntax Notation/Byte Encoding Rules, Lightweight Data Access Protocol, etc.). Various realizations of the invention update directory messages differently (e.g., information is updated based on size, section, field, etc.).

Figure 4:
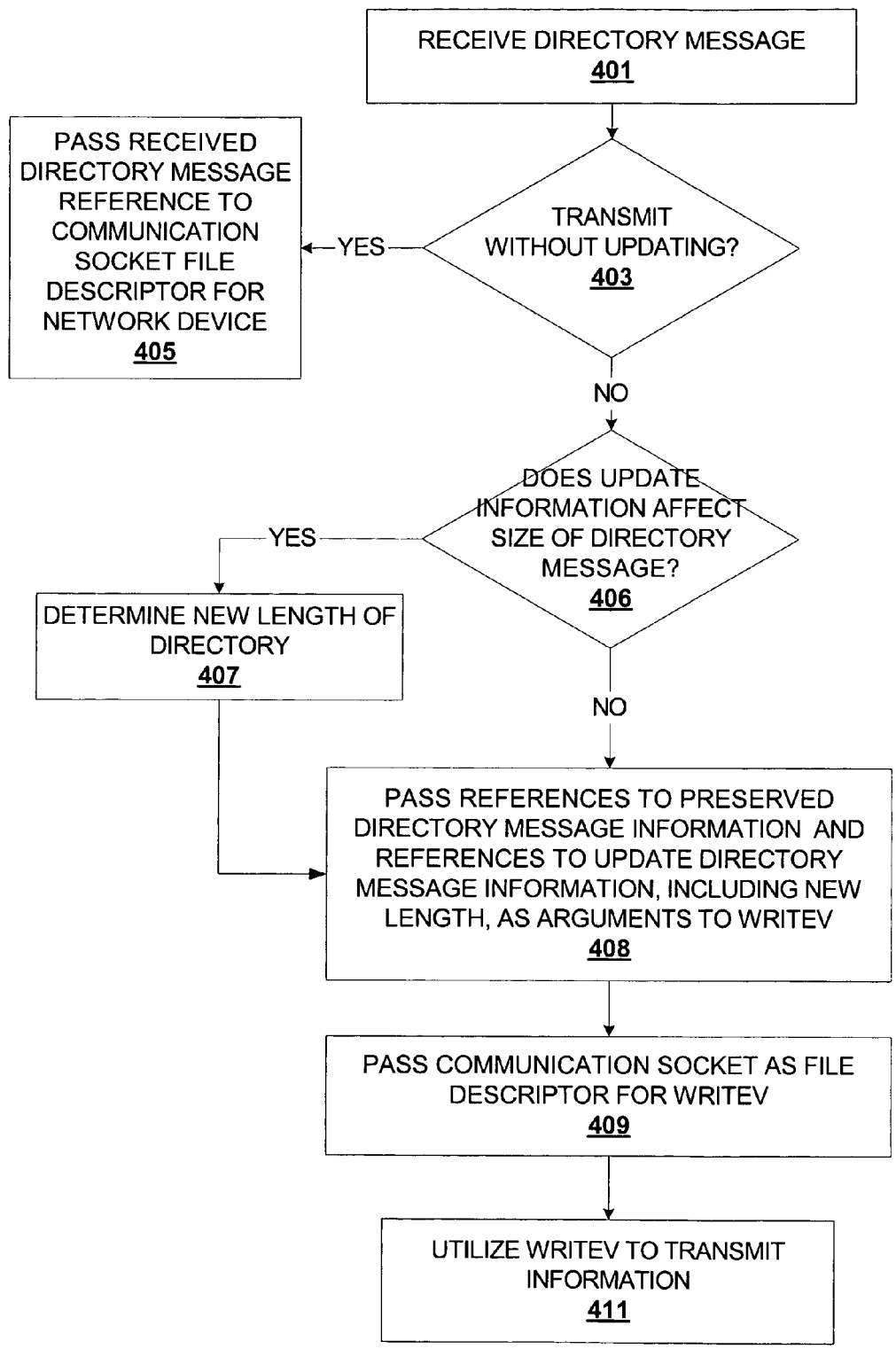
FIG. 4 depicts a flowchart for providing references to preserved directory message information and update'directory message information according to some realizations of the invention.

FIG. 4 depicts a flowchart for providing references to preserved directory message information and update directory message information according to some realizations of the invention. FIG. 4 refers to a specific function for transmitting information with indicators for purposes of illustrating the described invention and not meant to be limiting upon the invention. Any of a variety of techniques can be utilized for the described invention including various functions (such as writev). At block 401, a directory message is received. At block 403, it is determined if the directory message is to be transmitted without updating. If the directory message is to be transmitted without updating, then control flows to block 405. If the directory message is to be updated before transmission, then control flows to block 406.

At block 405, a reference to the received directory message is passed to a communication socket file descriptor for a network device (i.e., a file descriptor used by a communication socket).

At block 406, it is determined if the update directory message information affects the size of the directory message. If the update directory message affects the size of the directory message, then control flows to block 407. If the update information does not affect the size of the directory message, then control flows to block 408.

At block 407, the new length of the directory message is determined (e.g., the sum of the preserved directory message information size, the update directory message information size, and the size of the new size indication). Control flows from block 407 to block 408.

At block 408, references to the preserved directory message information and the update directory message information, including the new directory message size if applicable, is passed as arguments to a writev function. At block 409, a communication socket is passed to the writev function as the file descriptor. At block 411, the writev function is utilized to transmit the preserved directory message information and the update directory message information. For example, the writev function is used by the device driver for a network card, a communication protocol process, etc.

For example, a proxy receives a directory message in a receive buffer. Instead of copying the directory message into another memory from the buffer, the proxy utilizes one or more addresses of various locations in the receive buffer of directory message information to be preserved. The proxy then generates the update directory message information at a location in its system memory. The proxy provides the addresses of the preserved directory message information and the update directory message information to a communication protocol process. The communication protocol process writes the preserved directory message information and the update directory message information to a transmit buffer using the addresses. Hence, in this example, the directory message, in both its transmit form and its receive form, occupies enough of system memory for the update information a single time, instead of multiple times for the update information, the message, and a sum of the update information and the message.

In addition to more efficient use of memory, other resources in addition to memory resources can be used in accordance with a state of load equilibrium to put back-pressure on clients. This back-pressure increases the efficient use of additional resources. A proxy operates within the boundaries of its own resources, and, since a proxy sits between clients and servers, the proxy operates within the speed and network connectivity boundaries of the clients and the servers. If applications, which correspond to messages transmitted between the clients-proxy-servers, do not have sufficient resources available from the hosting proxy at a given time to process a request message, then the request can be delayed even if resources are available to queue the request. By limiting acceptance of requests to those that can be processed immediately, resources can be utilized more efficiently.

A state of load equilibrium for a proxy corresponds to the number of requests that the proxy can process given a configuration, load of requests, mix of requests, etc. Given a load equilibrium state, resources can be pre-allocated because the same amount of resources will be used in each time interval. Pre-allocating resources significantly reduces the probability that new resources will be requested from the operating system (or whatever entity manages resources). In addition, reducing requests for new resources reduces expenditure of resources, such as processor resources, spent on allocating and de-allocating resources. The amount of pre-allocated resources vary in accordance with the time interval for a given load equilibrium state. For instance, a small amount of resources satisfies a small time interval.

Since the proxy does not process the request messages that cannot immediately be processed, those messages remain unprocessed in a communication protocol queue (e.g., a Transmission Control Protocol queue). In accordance with the communication protocol, a client will not transmit additional request messages until acknowledgement of previously transmitted request messages. Furthermore, multiplexing on the server side connections and using I/O completion ports on the client side further increases efficient resource utilization.

Consider LDAP clients in an example to illustrate backpressure. Typical LDAP clients perform synchronous operations (i.e., they await responses before submitting more request messages). If a proxy pre-allocated sufficient memory to decode two request messages per client, then the probability that memory will have to be allocated again is substantially small. If the pre-allocated memory reaches a certain threshold, then messages requests will not be retrieved from the clients.

While the flow diagrams show a particular order of operations performed by certain realizations of the invention, it should be understood that such order is exemplary (e.g., alternative realizations may perform the operations in a different order, combine certain operations, overlap certain operations, perform certain operations in parallel, etc.).

The above described method, the operations thereof and modules therefore may be executed on a computer system configured to execute the operations of the method and/or may be executed from machine-readable media. Computer systems may be found in many forms including but not limited to mainframes, minicomputers, servers, workstations, personal computers, notepads, personal digital assistants, various wireless devices and embedded systems, just to name a few. A typical computer system includes at least one processing unit, associated memory and a number of input/output (I/O) devices. A computer system processes information according to a program and produces resultant output information via I/O devices. A program is a list of instructions such as a particular application program and/or an operating system. A computer program is typically stored internally on machine-readable storage media or transmitted to the computer system via a machine-readable transmission medium. A computer process typically includes an executing (running) program or portion of a program, current program values and state information, and the resources used by the operating system to manage the execution of the process. A parent computer process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Figure 5:
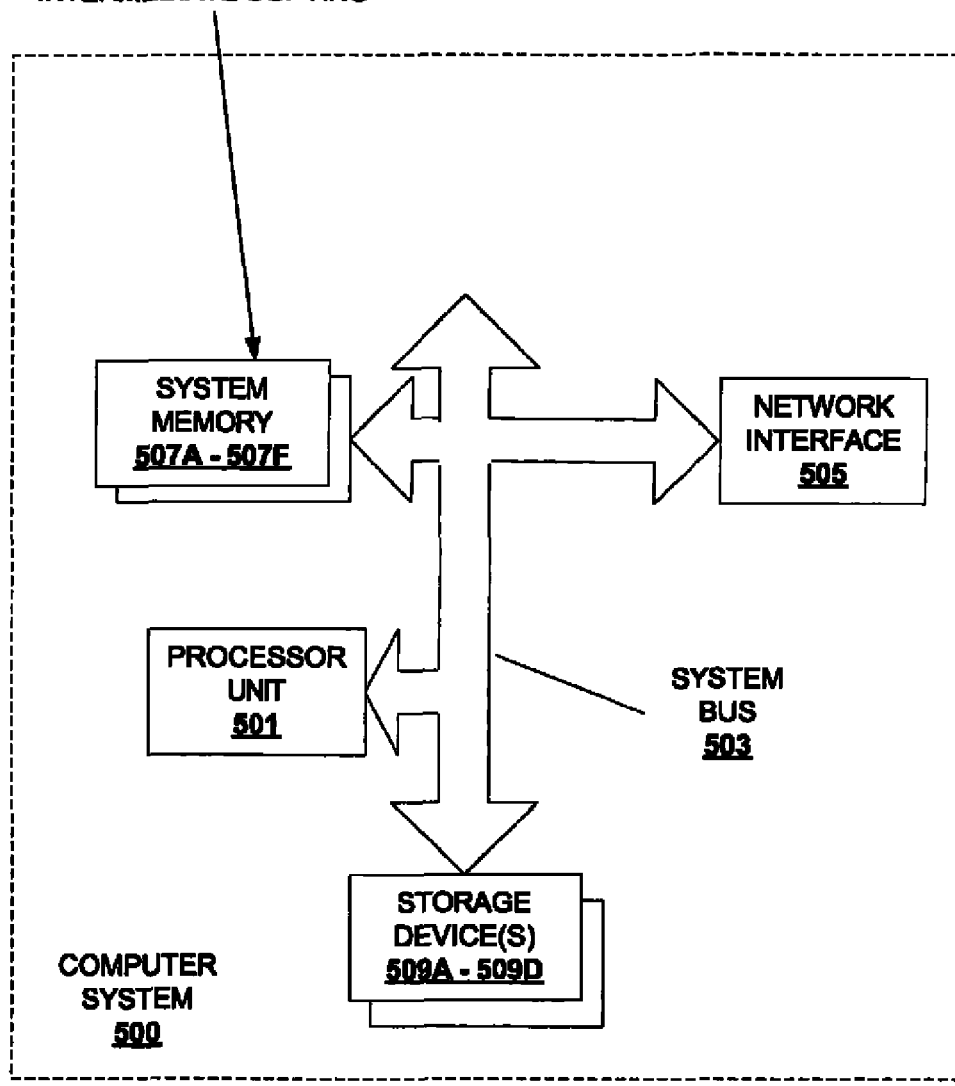
FIG. 5 depicts an exemplary computer system according to some realizations of the invention.

FIG. 5 depicts an exemplary computer system according to some realizations of the invention. A computer system 500 includes a processor unit 501 (possibly including multiple processors). The computer system 500 also includes a system memory 507A-507F (e.g., one or more of cache, SRAM DRAM, RDRAM, EDO RAM, DDR RAM, EEPROM, etc.) that embodies a proxy that efficiently transmits directory messages with indications and without intermediate copying. The system also includes a system bus 503 (e.g., LDT, PCI, ISA, etc.), a network interface 505 (e.g., an ATM interface, an Ethernet interface, a Frame Relay interface, etc.), and a storage device(s) 509A-509D (e.g., optical storage, magnetic storage, etc.). The proxy may include one or more communication protocol interfaces to interact with communication protocol processes (e.g., TCP/IP, ATM, Ethernet, etc.), to interact with a network card device driver, etc. Realizations of the invention may include fewer or additional components not illustrated in FIG. 5 (e.g., video cards, audio cards, additional network interfaces, peripheral devices, etc.). The processor unit 501, the storage device(s) 509A-509D, the network interface 505, and the system memory 507A-507F are coupled to the system bus 503.

Although FIG. 5 illustrates the system memory 507A-507F as embodying the proxy, realizations of the invention implement the proxy differently (e.g., dedicated hardware, firmware, a network card or ASIC, an instantiation of multiple proxies, an agent process controlled from a master process over a network or within the same system, instructions encoded in the processor unit 501, instructions stored in one or more of the storage devices 509A-509D, etc.).

The method described above may be embodied in a machine-readable medium for configuring a computer system to execute the method. The machine-readable media may be permanently, removably or remotely coupled to the system 500 or another system. The machine-readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, main memory, RAM, etc. Other new and various types of machine-readable media may be used to store the software modules discussed herein.

While circuits and physical structures are generally presumed, it is well recognized that in modern semiconductor and design fabrication, physical structures and circuits may be embodied in machine-readable descriptive form suitable for use in subsequent design, test, or fabrication stages as well as in resultant fabricated semiconductor integrated circuits. Accordingly, claims directed to traditional circuits or structure may, consistent with particular language thereof, read upon machine-readable encodings and representations of same, whether embodied in media or combined with suitable reader facilities to allow fabrication, test, or design refinement of the corresponding circuits and/or structures.

While particular embodiments of the present invention have been shown and described, it will be clear to those skilled in the art that, based upon the teachings herein, various modifications, alternative constructions, and equivalents may be used without departing from the invention claimed herein. For example, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Consequently, the appended claims encompass within their scope all such changes, modifications, etc. as are within the spirit and scope of the invention. Furthermore, it is to be understood that the invention is solely defined by the appended claims. The above description is not intended to present an exhaustive list of embodiments of the invention. Unless expressly stated otherwise, each example presented herein is a nonlimiting or nonexclusive example, whether or not the terms nonlimiting, nonexclusive or similar terms are contemporaneously expressed with each example. Although an attempt has been made to outline some exemplary embodiments and exemplary variations thereto, other embodiments and/or variations are within the scope of the invention as defined in the claims below.

What is claimed is:

1. A method of operating a proxy comprising:
   receiving into memory a first message;
   indicating in an ordered encoding a memory location for one or more of a predetermined set of portions of the first message to be maintained;
   indicating in the ordered encoding a memory location for update data; and
   using the ordered encoding to transmit a second message that includes the maintained first message portions and the update data in accordance with the ordered indications without copying the first message.

2. The method of claim 1 wherein the ordered encoding also includes respective lengths of the indicated maintained first message portions and the update data.

3. The method of claim 1 wherein the update data replaces one or more portions of the message that are not maintained.

4. The method of claim 3 wherein the replaced portions occur in the middle of the first message.

5. The method of claim 1 wherein the update data is appended to the first message.

6. The method of claim 1 wherein the ordered encoding includes entries for at least portions of the first message that may possibly be updated.

7. The method of claim 1 wherein the total length of the first message and the total length of the second message are not equal.

8. The method of claim 1 wherein the predetermined set of portions is in accordance with the type of the first message.

9. The method of claim 8 wherein the first message type is in accordance with one or more of X.200, X.400, X.500, lightweight data access protocol, and open lightweight data access protocol.

10. The method of claim 9 wherein the predetermined set of portions of the first message include one or more of message type field, total message length field, and session identifier fields.

11. The method of claim 8 wherein the first message type is in accordance with a standard that complies with Abstract Syntax Notation.

12. The method of claim 1 wherein the update data is a set of predetermined data that includes one or more of length field, field extensions, session identifier, message identifier, and control information.

13. The method of claim 2 further comprising generating the second message with the encoding.

14. The method of claim 13 wherein generating the second message with the encoding includes passing the ordered encoding to a facility that writes for transmission the second message in accordance with the ordered encoding.

15. The method of claim 1 wherein the ordered encoding includes one or more of a hash table, a binary search tree, a trie, a multi-dimensional array, and a linked list.

16. The method of claim 1 wherein the first and the second message are encoded according to one or more of Basic Encoding Rules and Distinguished Encoding Rules.

17. A method comprising:
   determining a first set of data of a first message to be preserved;
   determining a second set of data to be included in a second message with the preserved data; and
   indicating memory locations of the first and second set of data in an ordered encoding wherein the one or more of the entries of the ordered encoding have been pre-determined for at least a portion of the first set of data;
   submitting the ordered encoding for transmission of the second message, wherein the second message is in accordance with the order of the first and second sets of data as indicated by the ordered encoding.

18. The method of claim 17 wherein the ordered encoding indicates respective lengths of the indicated data.

19. The method of claim 17 wherein the portion of the first set of data includes one or more of total message length, session identifier, message identifier, server credentials, server authentication, and data extensions.

20. The method of claim 17 wherein the pre-determined entries of the ordered encoding are also for at least a portion of the update data.

21. The method of claim 17 wherein the encoding is dynamically modifiable in accordance with the determining of the first and second sets of data.

22. The method of claim 17 wherein the encoding includes a hash table, an array, a tree, and a linked list.

23. The method of claim 17 wherein the first message is encoded in accordance with one or more of Basic Encoding Rules and Distinguished Encoding Rules.

24. The method of claim 17 wherein the structure of the first message is in accordance with a standard that includes one or more of X.200, X.400, X.500, Lightweight Data Access Protocol.

25. The method of claim 24 wherein the standard's language is in accordance with Abstract Syntax Notation.

26. The method of claim 17 wherein the submitting comprises using the ordered encoding to write the first and second sets of data to a network interface in accordance with the order of their memory location indications.

27. The method of claim 26 wherein the network interface includes one or more of a logical socket and a physical socket.

28. The method of claim 17 wherein the first and second sets of data includes one or more of message characteristic information, message data, control information, message tags, and message identifiers.

29. The method of claim 17 wherein the memory location indications include one or more of physical address, virtual address, hash values, and indices.

30. A proxy that indicates a first set of one or more memory locations of a first set of information included in a first message and a second set of one or more memory locations of a second set of information related to the first message, and that provides an ordered encoding of the first and second sets of memory location indications for transmission of a second message that includes the first and second sets of information, wherein the order of the first and second sets of information in the second message is in accordance with the order of the encoding.

31. The proxy of claim 30 wherein provides the indications comprises the proxy writing the first and second sets of information to a network interface for transmission.

32. The proxy of claim 31 wherein the network includes one or more of physical sockets and logical sockets.

33. The proxy of claim 31 wherein the proxy performs the writing with a function that includes writev.

34. The proxy of claim 30 wherein the ordered encoding includes entries for one or more of at least a portion of the first set of information, which is pre-defined as possibly modifiable, and extension information.

35. The proxy of claim 30 wherein the encoding includes a dynamically adjustable number of entries for information to be preserved and for update information.

36. The proxy of claim 30 wherein the encoding includes respective lengths of the first and second set of information at their memory locations.

37. The proxy of claim 30 wherein the second set of information replaces information of the first message not indicated in the ordered encoding.

38. The proxy of claim 30 wherein the second set of information is appended to the first set of information.

39. The proxy of claim 30 wherein the first and second sets of information include one or more of message characteristic information, message data, message tag, session identifier, server authentication information, server credentials, length field, and message identifiers.

40. The proxy of claim 30 wherein the indications include one or more of physical addresses, virtual addresses, hash values, and indices.

41. The proxy of claim 30 wherein the messages comply with one or more standards including X.200, X.400, X.500, Lighweight Data Access Protocol, and Open Lightweight Data Access Protocol.

42. The proxy of claim 41 wherein the one or more standards are in accordance with Abstract Syntax Notation.

43. A directory system comprising:
a plurality of directory resources;
a proxy for the plurality of directory resources intercepting directory messages and updating intercepted directory messages,
wherein the proxy uses an ordered encoding that indicates memory locations corresponding to one or more segments of the directory messages to be preserved for transmission and memory locations corresponding to update segments to be added to the preserved segments for transmission of updated intercepted directory messages, and
wherein the updated intercepted directory messages are in accordance with the ordered encoding.

44. The directory system of claim 43 further comprising one or more additional proxies.

45. The directory system of claim 44 wherein the proxies perform load balancing.

46. The directory system of claim 43 wherein the location indications include one or more of physical addresses, virtual addresses, hash values, and indices.

47. An apparatus comprising:
memory to receive messages; and
a means for transmitting an ordered encoding that indicates one or more memory locations of portions of a received message to be preserved and that indicates one or more memory locations of update data to update received messages.

48. The apparatus of claim 47 wherein the memory location indications include one or more of physical addresses, virtual addresses, hash values, and indices.

49. The apparatus of claim 48 wherein the addresses include virtual addresses and physical addresses.

50. The apparatus of claim 47 wherein the message conforms to one or more of Lightweight Data Access Protocol, Open Lightweight Data Access Protocol, X.200, X.400, and X.500.

51. The apparatus of claim 47 further comprising one or more network cards that receive and transmit messages.

52. The apparatus of claim 47 wherein the information includes one or more of tag, length, value, session identifier, and control information.

53. The apparatus of claim 47 further comprising means for applying back-pressure to clients.

54. A computer program product encoded in one or more machine-readable media, the computer program product comprising:
a first sequence of instructions to process a received message and to determine data of the message to be preserved and memory locations thereof, and
to determine update data and memory locations thereof; and
a second sequence of instructions to indicate the determined memory locations in an ordered encoding, wherein the order of the encoding is in accordance with order the type of the received message.

55. The computer program product of claim 54 wherein the ordered encoding also includes respective lengths of the data at their memory locations.

56. The computer program product of claim 55 further comprising a third sequence of instructions to write the to be transmitted message from the preserved data and the update data as indicated by the ordered encoding to a communication socket.

57. The computer program product of claim 56 wherein the communication socket includes one or more of a logical socket and a physical socket.

58. The computer program product of claim 54 further comprising a communication protocol interface.

59. The computer program product of claim 54 wherein the memory location indications include one or more of hash values, physical addresses, virtual addresses, and indices.

60. The computer program product of claim 54 wherein the data includes tags, lengths, values, control information, session identifiers, sets of data, and message segments.

61. The computer program product of claim 54 further comprising a third sequence of instructions to determine a pre-allocation resource amount based at least in part on a load state equilibrium and to limit processing of request message in accordance with the pre-allocation resource amount.

* * * * *